(No Model.)

R. GRISWOLD.
HAY AND GRAIN RACK.

No. 279,938.        Patented June 26, 1883.

WITNESSES:
Chas. Nides
C. Sedgwick

INVENTOR:
R. Griswold
BY Munn & Co
ATTORNEYS.

UNITED STATES PATENT OFFICE.

ROBERT GRISWOLD, OF WOODEY, KANSAS.

HAY AND GRAIN RACK.

SPECIFICATION forming part of Letters Patent No. 279,938, dated June 26, 1883.

Application filed October 11, 1882. (No model.)

*To all whom it may concern:*

Be it known that I, ROBERT GRISWOLD, of Woodey, in the county of Lincoln and State of Kansas, have invented a new and useful Improvement in Hay and Grain Racks, of which the following is a full, clear, and exact description.

Reference is to be had to the accompanying drawings, forming a part of this specification, in which similar letters of reference indicate corresponding parts in all the figures.

Figure 1 is a side elevation of my improvement shown as applied to a wagon. Fig. 2 is an end view of the same, one side of the rack being shown turned down. Fig. 3 is a plan view of a part of the netting.

The object of this invention is to facilitate the loading and unloading of hay and loose grain.

The invention consists in a hay and grain rack constructed with separable sides, and provided with a lining-netting secured detachably to the said sides by snap-hooks and rings, whereby the said sides can be readily removed and the netting connected with an elevating mechanism to allow the load to be taken off in a body.

The invention further consists in the combination, with the bottom, ends, and sides of the rack, of ropes and buttons, whereby the said sides will be held securely in place, and can be readily detached, as will be hereinafter fully described.

A represents the running-gear of an ordinary farm-wagon.

B represents the frame of an ordinary hay-rack.

To the frame B are secured the ends C of the rack.

D are the sides of the rack, which can be strengthened by having hoop-iron secured to them by screws or nails. The spaces between the upright and longitudinal bars of the sides of the rack are crossed by wires E, attached to the said bars by staples or other suitable means, to prevent the loose hay or grain from being blown out by the wind. A space can be left at the middle part of the sides D, as shown in Fig. 1, to allow forkfuls of hay to be pushed in through the said sides. The bottom bars of the sides D rest upon the cross-bars of the frame B, and are kept from slipping off by stop pins or blocks F attached to the said cross-bars.

To the corners of the sides D are attached small ropes G, which are passed two or three times around the said corners and the ends of the cross-bars of the ends C or cross-bars of the frame B, and are then secured to cleats or buttons H, attached to the rack ends C. The ends C and sides D are made of such a height as to give form to the load, so that the load can be put on without a load-builder.

I represents a netting of small cords, which cross each other at right angles, and are secured to each other at the points of crossing. The netting I is made of such a size as to cover the inner surface of the bottom frame, B, and the rack sides D.

To the ends of the cross-cords of the netting I are attached snap-hooks J, which, when the said netting is spread over the rack to receive the load, are designed to be hooked into rings K, attached to the said rack, so as to keep the netting spread out when receiving the load. With this construction the loaded hay will press out between the stakes and beneath the top rail of the wagon, carrying with it the netting, so that it is impossible to lift it all out of the frame at once. For this reason I have adapted the sides of the rack to be readily removed, and when the load is to be taken off, one of the side racks, D, is detached and the side edges of the netting I are secured by means of the snap-hooks J to any suitable elevating mechanism, and the entire load can be removed from the wagon in a body and deposited upon a stack.

I am aware that a netting has before been used to lift a load of wheat-heads from a wagon having box-sides, and I do not claim that as my invention; but

I claim—

A hay-rack consisting of a wagon having open-work frame sides and ends, the sides adapted to be readily removed, in combination with a lining-net provided with loops at its edges, whereby the whole load may be lifted in a body from the wagon, as specified.

ROBERT GRISWOLD.

Witnesses:
A. U. MARSHALL,
F. L. PRINDLE.